United States Patent [19]

Iura et al.

[11] 4,079,396
[45] Mar. 14, 1978

[54] FOCAL PLANE SHUTTER UNIT

[75] Inventors: Yukio Iura, Yokosuka; Masayoshi Yamamichi, Kawasaki; Takashi Uchiyama, Yokohama; Tetsuya Taguchi, Kawasaki; Yukio Mashimo, Tokyo, all of Japan

[73] Assignee: Canon Kabushiki Kaisha, Tokyo, Japan

[21] Appl. No.: 671,158

[22] Filed: Mar. 29, 1976

Related U.S. Application Data

[63] Continuation of Ser. No. 536,298, Dec. 26, 1974, abandoned.

[30] Foreign Application Priority Data

Dec. 28, 1973   Japan .................................. 48-492241

[51] Int. Cl.$^2$ ............................................. G03B 19/12
[52] U.S. Cl. ..................................... 354/152; 354/241; 354/288
[58] Field of Search ............................... 354/241–244, 354/202, 288, 152

[56] References Cited

U.S. PATENT DOCUMENTS

| | | | |
|---|---|---|---|
| 3,289,561 | 12/1966 | Maurer | 354/244 |
| 3,759,156 | 9/1973 | Kobori | 354/244 |
| 3,812,513 | 5/1974 | Berk et al. | 354/241 |

Primary Examiner—John Gonzales
Attorney, Agent, or Firm—Toren, McGeady and Stanger

[57] ABSTRACT

A focal plane shutter unit for a camera has a dimension-stable framework which has a rear wall member provided with an exposure aperture and with a film guide channel defining a path of the film behind the exposure aperture and which has a front surface to which a support structure having means for receiving and holding a lens mount is fixedly secured so that a predetermined spatial relationship between the objective lens and the film plane is established with dimension-stability, though the internal and external camera housing sections are made from a dimension-unstable material such as plastic. The framework is further adapted to carry front and rear shutter curtains with respective drive means, front curtain actuating means, rear curtain actuating means, and shutter cocking means coupled to the film wind mechanism of the camera.

3 Claims, 3 Drawing Figures

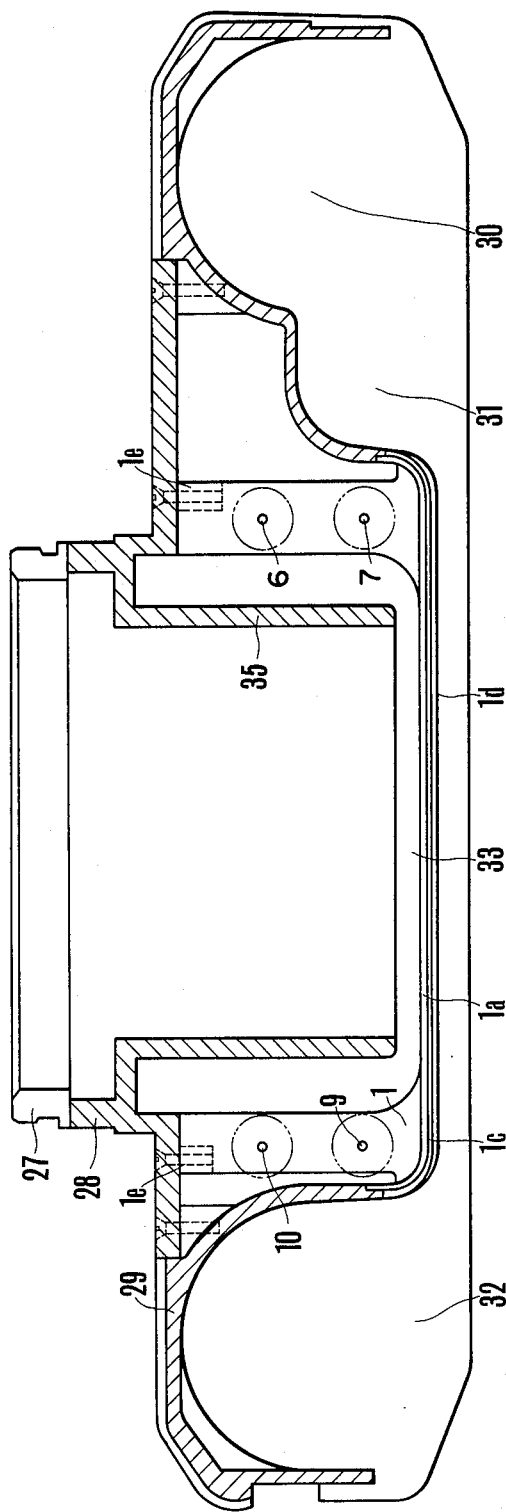

FOCAL PLANE SHUTTER UNIT

This is a continuation of Application Ser. No. 536,298 filed on Dec. 26, 1974, now abandoned.

BACKGROUND OF THE INVENTION

This invention relates to photographic cameras, and more particularly to focal plane shutter units for cameras.

The presently available cameras generally employ an aluminum camera housing formed by die casting. Recently attempts have been made to decrease the weight of a camera by using plastics as a material of the camera housing. Although the plastics are light weight and characterized by good formability which assists in providing complicated articles in a simple forming operation to thereby give a great advantage of reducing the production cost of the camera body, the plastic moldings are very susceptible to shrinkage and deformation resulting from the aging and ambient temperature variation. Consequently, the spatial relationships of the camera parts directly mounted in the plastic housing of the camera are difficult to be stabilized with time. If a change in the dimension between the objective lens and the focal plane accidentally occurs, a decrease in the quality of an image formed on the focal plane will result. For this reason, the employment of plastics in making camera bodies is limited to those designed to be equipped with objective lenses having relatively small relative apertures and short focal lengths.

SUMMARY OF INVENTON

The present invention has for its object to enable a high-class camera such as a single lens reflex camera having the interchangeability of various objective lenses to employ a plastic body for the purpose of reducing the weight of the camera without sacrificing its performance.

To achieve this object, the present invention contemplates the use of a metal framework for establishing a predetermined stable spatial relaionship between the objective lens and the focal plane and for mounting a focal plane shutter of the camera and the operating mechanism therefor. The framework is further adapted for incorporation in a plastic housing. By means of this structure, it is possible to provide a camera of which the weight is reduced by virtue of the plastic material while still preserving good imaging and shutter-operating performances. Such a camera shutter unit may be manufactured in separate form from the camera housing, therby giving an advantage of reducing the manufacture cost of the camera.

BRIEF DESCRIPTION OF THE DRAWING

Other objects and advantages of the invention will become apparent from the following detailed description taken in conjunction with the accompanying drawings in which like reference numerals refer to like elements and in which:

FIG. 2 is a fragmentary schematic perspective view illustrating the mechanical linkage between the shutter mechanism and the film wind mechanism and FIG. 3 is an enlarged top sectional view of a camera body showing the incorporation of the shutter unit of FIG. 1 within the camera housing.

DETAILED DESCRIPTION OF THE INVENTION

Figure 1:
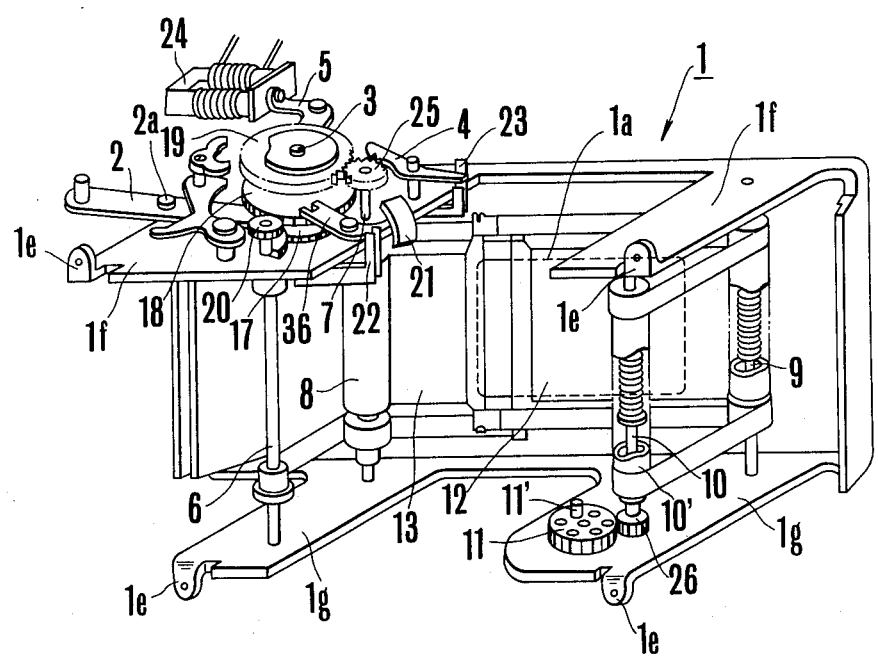
FIG. 1 is a schematic perspective view of one embodiment of a focal plane shutter unit according to the present invention.

Referring now to FIGS. 1 and 3, a focal plane shutter unit constructed in accordance with a preferred embodiment of the present invention comprises rigid framework 1 made from aluminum by die-casting or pressing which has a rear wall member 1c provided with an exposure aperture 1a and a film guide channel 1d and which has upper and lower wall members 1f and 1g perpendicularly and forwardly extending from the rear wall member 1c and having at their front edges upwardly or downwardly deflected flanges 1e by means of which a lens mount support structure 28 fixedly carrying means 27 for receiving and holding a lens mount not shown is rigidly secured to the framework 1 by screws which are threaded into the flanges 1e so that the predetermined spatial relationship between the objective lens and film plane is accurately established. In the case of a single lens reflex camera, the upper and lower wall members 1f and 1g each are provided with a cutout to accommodate a mirror box 35. The framework is so dimensioned that when it is incorporated in the camera housing 29 as shown in FIG. 3, a light-tight contact is established between the upper, lower and rear walls of the framework 1 and the integral internal housing of the camera to form each of the film supply chamber 32, film take-up chamber 30 and exposure station 33.

Location of the shutter mechanism:

The shutter has front and rear curtains 12 and 13, the front curtain 12 operating between a winding drum assembly fixedly mounted on a shaft 6 and a spring powered windable drum 9, and the rear curtains 13 operating between a winding drum 8 fixedly mounted on a shaft 7 and a spring powered drum 10' fixedly mounted on a shaft 10. The shafts of drum 9 and shaft 10 are mounted between the right upper and lower wall members 1f and 1g as viewed in FIG. 1. The shafts 6 and 7 are mounted between the left upper and lower wall members 1f and 1g and have at their respective upper ends gears 20 and 25 respectively meshing with larger gears 18 and 19 rotatable about a common shaft 3.

Figure 2:
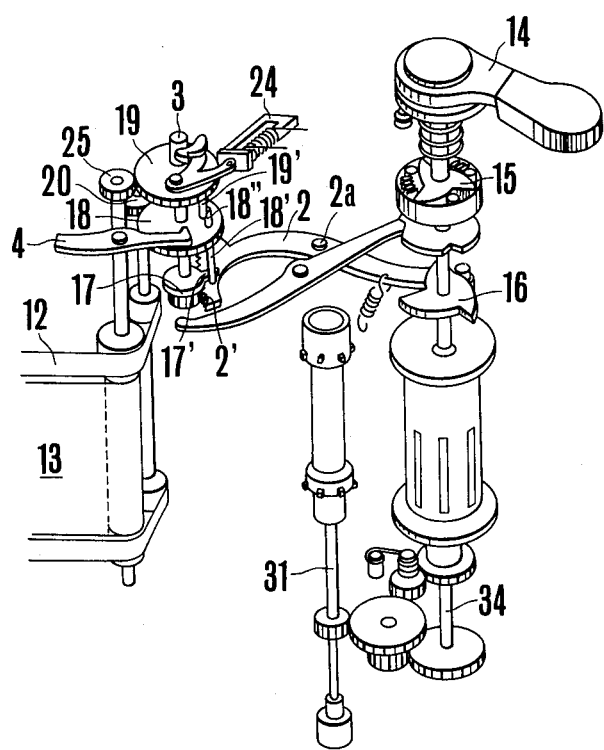

As shown in FIG. 2, within the camera housing is mounted a film wind mechanism including a drive shaft 34 and a film advancing sprocket shaft 31 connected to shaft 34 through a gear train as is well known in the art. When the arm 14 is cocked, the motion of arm 14 is transmitted through a single-direction clutch 15 to the shaft 34, thereby a cam disc 16 coaxially affixed to the shaft 34 is turned through a predetermined angular distance, causing a counter-clockwise movement of a transfer lever 2 pivoted at 2a which in turn rotates a gear 17 about the shaft 3. Such a rotation of gear 17 causes gears 18 and 19 to rotate through a successive pin connection comprising a pin 17' on gear 17, pins 18' and 18'' on gear 18 and a pin 19' on gear 19, thereby the front and rear curtains 12 and 13 are set in the cocked positions as being wound up about the drums on shafts 6 and 7. After the gear 18 is arrested by the hook of a pawl lever 4, the cam disk 16 is returned to its initial rest position under the action of a return spring and at the same time the gear 17 also is returned to its initial position.

When the camera operator depresses the shutter button, the mirror mechanism is actuated and at the termination of upward pivoting movement of the mirror, the mirror drive member actuates the lever 4 to release the front curtain master gear 18, thereby the front curtain 12 is caused to run off under the action of the spring in drum 9. At the same time, a count start switch 23 is opened and the shutter control circuit begins to operate. After a time interval determined by the time constant circuit, the electromagnet 24 is energized to release the rear curtain master gear 19 from the lever 5, thereby the rear curtain is permitted to run down to terminate the exposure. At this time, a gear 11 meshing with a pinion 26 mounted on the bottom of drum 10' rotates so that a pin 11' mounted on the gear 11 provides a signal by which the mirror and automatic diaphragm mechanisms are set to their initial positions. In order to operate a brake 21 and a synchro-contact 22 at the termination of the running down of the rear curtain 13, there is provided a lever 36 cooperative with the front curtain master gear 18.

What is claimed is:

1. A single lens reflex camera comprising in combination a lens support structure for mounting various types of interchangeable lenses thereon, a camera housing formed of plastics including a film supply chamber and a film take-up chamber, a focal plane shutter unit mounted in said camera housing comprising a metallic framework, said metallic framework comprising an upwardly extending rear wall provided with an exposure aperture and a film guide plane, an upper wall extending perpendicularly from an upper portion of said rear wall, a lower wall extending perpendicularly from a lower portion of said rear wall and spaced from said upper wall, front mounting surfaces located on said upper wall and lower wall and spaced a predetermined distance from said film guide plane, said lens support structure mounted on said front mounting surfaces, and a focal plane shutter mechanism supported between said upper wall and said lower wall.

2. A single lens reflex camera comprising, in combination, a lens support structure for mounting various types of interchangeable lenses thereon, a camera housing formed of plastics having a winding-up mechanism for the winding film and for shutter setting, a focal plane shutter unit mounted in said camera housing and comprising a metallic framework, said metallic framework comprising an upwardly extending rear wall provided with a film guide plane, an upper wall extending perpendicularly from an upper portion of said rear wall, a lower wall extending perpendicularly from a lower portion of said rear wall and spaced below said upper wall, front mounting surfaces on said upper wall and lower wall and spaced a predetermined distance from said film guide plane, a focal plane shutter mechanism supported between said upper wall and said lower wall, and releasable means for controlling the movement of said focal plane shutter mechanism.

3. A single lens reflex camera, as set forth in claim 2, wherein said focal plane shutter unit includes means connected to said winding-up mechanism for transmitting the movement of said winding-up mechanism to said focal plane shutter mechanism for initially setting said focal plane shutter plane mechanism.

* * * * *

UNITED STATES PATENT OFFICE
CERTIFICATE OF CORRECTION

Patent No. 4,079,396            Dated    March 14, 1978

Inventor(s) Yukio Iura, M. Yamamichi, T. Uchiyama, T. Taguchi & Y. Mashimo

It is certified that error appears in the above-identified patent and that said Letters Patent are hereby corrected as shown below:

In the heading of the Patent [30] should read as follows:

[30] Foreign Application Data

Dec. 28, 1973 Japan........49-2241

Signed and Sealed this

Fifth Day of February 1980

[SEAL]

Attest:

SIDNEY A. DIAMOND

Attesting Officer      Commissioner of Patents and Trademarks